Sept. 23, 1969 E. A. WINSTON 3,469,041

TELEPHONE LOCK

Filed Jan. 3, 1966

INVENTOR.
EMANUEL WINSTON

BY Dominik & Stein

Attorneys

United States Patent Office 3,469,041
Patented Sept. 23, 1969

3,469,041

TELEPHONE LOCK

Emanuel A. Winston, 2925 W. Touhy Ave., Chicago, Ill. 60645

Filed Jan. 3, 1966, Ser. No. 518,371
Int. Cl. H04m 1/66
U.S. Cl. 179—189 5 Claims

ABSTRACT OF THE DISCLOSURE

A telephone lock consisting of a U-shaped structure, one arm being pivoted and containing a lock element, the second arm fitting into the finger grip cavity of the telephone.

This invention relates to locks and more particularly to telephone locks.

Telephone locks, as it is generally well known, are used to prevent unauthorized callers from placing a telephone call. The presently available telephone locks are generally of the type which are adapted to be lockingly engaged in one of the finger holes in the telephone dial to prevent the dial from being actuated. Such a "dial lock" is only moderately effective. The latch which provides the locking action in such a lock tends to wear the finger hole on the dial so that it becomes larger after a period of time. The lock can then be lifted out or it falls out, and is, therefore, ineffective. Where the dial is made of plastic, this problem is even more pronounced. And, in fact, the dial may, under such circumstance, be completely broken. Furthermore, a number may still be dialed with the dial lock locked in place on the dial. One need merely tap the hook switch plungers upon which the hand set normally rests. Such action causes a circuit break which duplicates the dial action. Also, with the advent of the new push button type telephones, dial locks are rendered virtually obsolete. There are no finger holes in which the dial lock can be secured.

Another disadvantage of the dial lock is that its small size makes it highly subject to being lost or misplaced, since it must be removed from the telephone to render the telephone operatve.

Accordingly, it is an object of the present invention to provide an improved telephone lock.

Another object is to provide a telephone lock which is adaptable to both the dial type telephone and the push button type telephone to prevent unauthorized personnel from using them. In this respect, it is contemplated that the telephone lock can be easily installed without the need of additional tools and without modifying the telephone instrument.

Still another object is to provide a telephone lock which, for all practical purposes, is fixedly secured to the telephone instrument; hence, it is not subject to being lost or misplaced.

A still further object is to provide an improved telephone lock of the above described type which is a relatively simple construction.

Other objects of the invention will in part be obvious and will in part appear hereinafter.

The above objectives are accomplished with a telephone lock which, according to a first embodiment of the invention, has a base which is adapted to be lockingly engageable in the finger grip formed beneath the cradle of a telephone base. A hand set lock is pivotally affixed to the base and is adapted to swing over the telephone hand set so as to prevent its removal. The hand set lock has a key operated lock affixed to it which has a cam which is lockingly engaged in a locking slot formed in the base. When the lock is actuated, the hand set lock is fixedly retained in position over the telephone hand set so that the hand set cannot be removed. The hook switch of the telephone cannot be operated with the hand set locked in the cradle, hence unauthorized use is prevented.

In accordance with a second embodiment of the invention, the hand set lock is modified to prevent operation of the hook switch plungers. The hand set can be removed, but since the hook switch plungers are locked in an inoperative position, unauthorized calls cannot be made.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which.

Similar reference characters refer to similar parts throughout the several views of the drawing.

Figures 1, 3, 5:
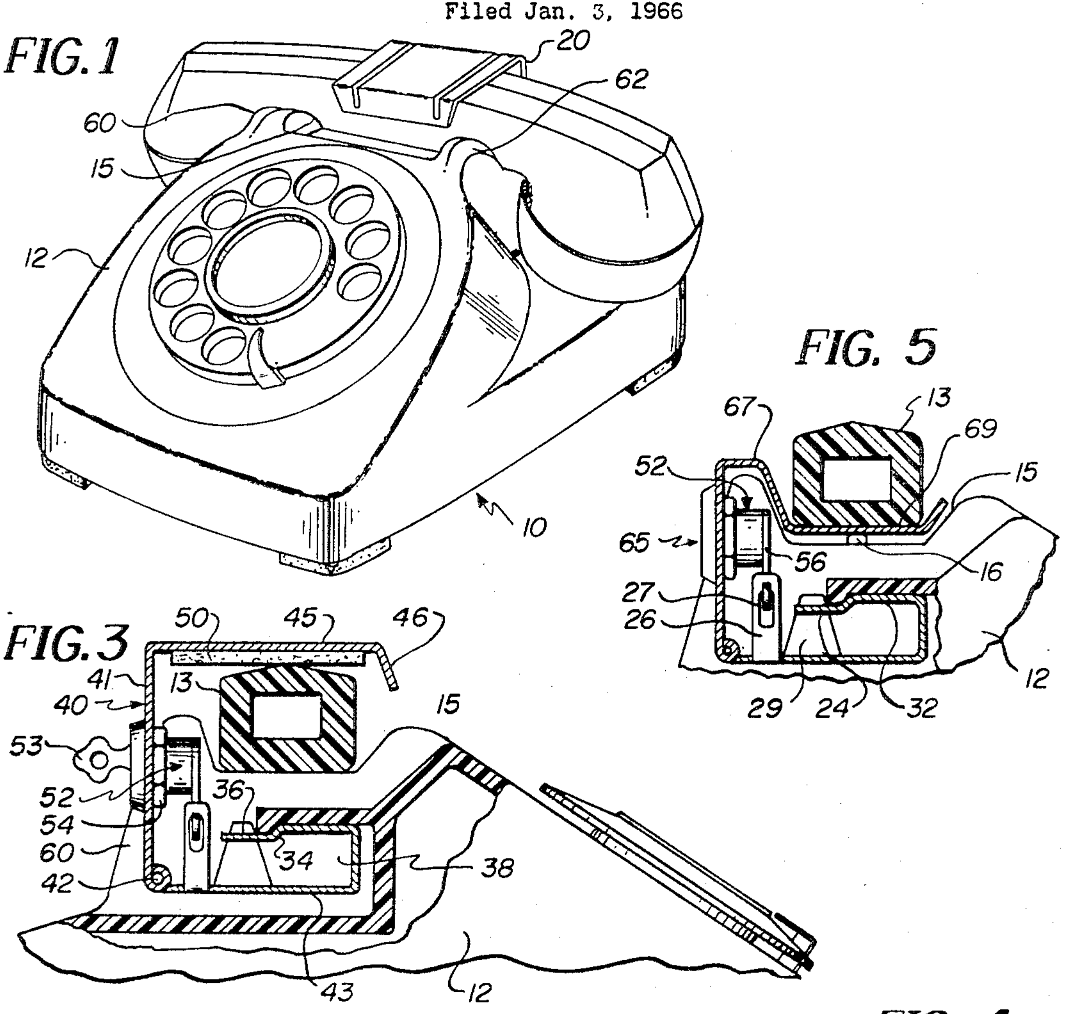
FIG. 1 is a perspective view of a telephone instrument, illustrating the manner in which the hand set is locked in a resting position on the cradle of the telephone base.
FIG. 3 is a partial side view of the telephone instrument of FIG. 1, partially sectioned to illustrate the manner in which the telephone lock is lockingly engaged with the telephone instrument and the manner in which the hand set is locked in position in the cradle of the telephone base.
FIG. 5 is a partial sectional view illustrating a telephone lock, exemplary of a second embodiment of the invention, which is adapted to lock the hook switch plungers in an inoperative position.

Referring now to the drawing, in FIG. 1, there is illustrated a telephone instrument 10 having a telephone base 12 and a hand set 13. When the telephone is not being used, the hand set is normally placed in a resting position on a cradle 15. When in this position, the hand set 13 engages and depresses the hook switch plungers 16 (FIG. 5) to render the hook switch inoperative. As it is well known, the hand set 13 must be lifted from the cradle 15 in order to render the telephone instrument 10 operative to place or answer a telephone call.

Figure 2:
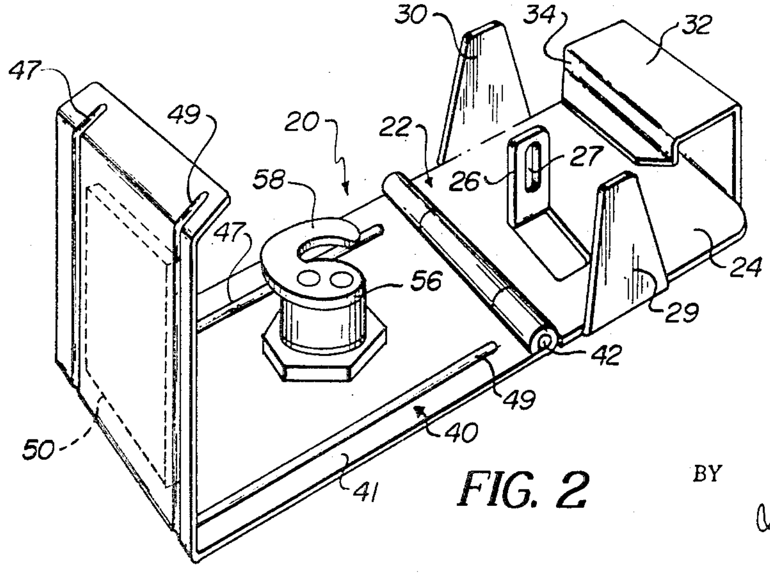
FIG. 2 is a perspective view of a telephone lock exemplary of a first embodiment of the invention.

The telephone lock 20, as best seen in FIG. 2, has a base 22 which is substantially U-shaped. One leg 24 of the base 22 has a vertically disposed lug 26 having a cam slot 27 formed therein. The lug 26 is preferably formed by stamping a correspondingly shaped cut-out in the leg 24 and folding the same upwardly at a right angle. An L-shaped lug of similar construction, however, can be fixedly secured to the leg 24, if desired. The leg 24 also has a pair of vertically disposed, substantially triangular shaped wings 29 and 30 formed along each of its opposite edges, in alignment with the lug 26. The wings 29 and 30 substantially conceal the lug 26 so that access cannot be gained to it when the telephone lock is installed and operated to lock the hand set 13 in the cradle 15 of the telephone instrument. The wings also provide stability so that a rocking action cannot occur.

Another leg 32 of the base 22 is substantially parallel with the leg 24 and has it end folded to form a rise 34 which is adapted to engage a downwardly depending lip 36 formed on the underside of the overhanging portion of the finger grip cavity 38 formed in the telephone base 12 beneath the cradle 15 (FIG. 3). This structure causes a firm positioning of the lock within the finger grip cavity 38.

A substantially L-shaped hand set lock 40 is pivotally secured to the base 22 by a hinge 42 and its one leg 41 is of a length which substantially corresponds to the distance from the bottom wall 43 of the finger grip cavity 38 (FIG. 3) to the top of the hand set 13 when in its resting position within the cradle 15 of the telephone base. Its other leg 45 which is folded at a right angle to the leg 41 extends over the hand set 13 when the latter is resting in the cradle 15. The end 46 of the leg 45 is folded downward (as seen in FIG. 3) to prevent the hand set 13 from being forcibly urged out from under the leg 45 of the hand set lock 40. A felt pad 50 or the like can be adhesively secured to the underside of the leg 45 to prevent marring the hand set 13.

Figure 4:
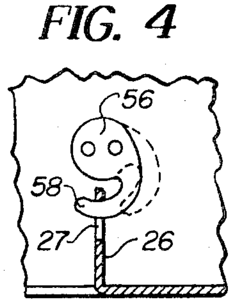
FIG. 4 is a fragmentary view illustrating how the cam affixed to the lock is engageable within the locking slot formed in the base of the telephone lock.

A lock 52 operable with a key 53 is extended through an aperture (not shown) in the leg 41 of the hand set lock 40 and is fixedly secured thereto by means of a nut 54 which is threadedly received on a threaded portion of the lock. A cam 56 is fixedly secured to the end of the lock 52 and has a curved cam portion 58 which is adapted to engage within the cam slot 27 of the lug 26 secured to the base 22 when the lock is operated, as can be seen in FIG. 4.

The base 22 and the hand set lock 40 are both fabricated of a heavy gauge metal so that considerable force is required to bend either portions in order to deform them sufficiently to permit removal of the hand set 13. A pair of spaced apart recessed grooves 47 and 49 which extend substantially along the entire length of the legs 41 and 45 can be formed therein to provide additional security.

The telephone lock 20 is easily installed by simply forcibly urging the base 24 into the finger grip cavity 38 formed in the telephone base 12 beneath the cradle 15, until the rise 34 locks behind the depending lip 36, as shown in FIG. 3. Installation is simple, and no additional tools or modifications of the telephone instrument is required.

To operate the telephone lock 20, the hand set lock 40 is simply pivoted about the hinge 42 until the leg 45 extends over the hand set 13, as shown in FIG. 3, and the key 53 is operated to engage the cam portion 58 of the lock 52 in the cam slot 27. The hand set 13 is now securely locked in resting position on the cradle 15, and the telephone instrument is rendered inoperative since the hook switch plungers 16, and hence the hook switch, cannot be operated. The procedure is reversed to permit the hand set 13 to be removed to render the telephone instrument operative to place or receive telephone calls.

As can be best seen in FIG. 3, when the base 22 of the telephone lock 20 is inserted in the finger grip cavity 38 and the hand set lock 40 is in its locking position over the hand set 13, it is virtually impossible to tamper with or remove the base 22 since it is concealed between the arms 60 and 62 (FIGS. 1 and 3) of the cradle 15 and by the leg 41 of the hand set lock 40. The telephone lock 20 is therefore securely fixed to the telephone instrument and cannot be easily removed. Also, as indicated above, the base 22 and the hand set lock 40 are fabricated of a heavy gauge metal so that it is generally impossible to deform the leg 45 sufficiently to remove the hand set 13 from the cradle 15 to render the telephone instrument operative, without the aid of additional tools, such as a screwdriver, a prying bar, or the like. The telephone lock 20, therefore, under normal circumstances, is effective to prevent unauthorized use of the telephone instrument.

In FIG. 5, a telephone lock 65 which is adapted to engage and to render the hook switch plungers 16 and hence the hook switch (not shown) inoperative is illustrated. The telephone lock 65 is constructed in substantially the same fashion as the telephone lock 20, only the hand set lock 40 is modified to provide a plunger lock 67. The plunger lock 67 is formed by modifying the leg 45 of the hand set lock 20 to provide a substantially T-shaped leg 69 which is bent so as to have a contour which substantially corresponds to that of the cradle 15 of the telephone base 12 and so that the T's crossbar overlies and engages the hook switch plungers 16. The end of the leg 69 is folded upwardly, so as to form a cradle for the hand set 13. In all other respects, the telephone lock 65 is the same as the telephone lock 20 and is installed in the same fashion.

To render the telephone instrument inoperative, the hand set lock is pivoted upwardly, in the manner previously described, to engage the T-shaped leg 69 with the hook switch plungers 16, and the lock 52 operated to engage the cam position 58 in the cam slot 27. In this case, the hand set 13 can be raised, but the telephone cannot be used to receive or place a telephone call since the hook switch plungers 16 and hence the hook switch are held in inoperative position.

From the above description, it can be seen that a telephone lock which is adaptable for use with both the conventional dial telephones and the new push-button type telephones is provided. Also, in each case the telephone lock can be easily installed without modification to the telephone instrument and without the need for additional tools or equipment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, an dall statements of the scope of the invention, which, as a matter of language, might be said to fall therebetween.

Now that the invention has been described, what is claimed as new and desired to be secured by Letters Patent is:

1. A telephone lock for use with telephone instruments having a telephone base and a hand set, a finger grip cavity in said telephone base, a cradle in said telephone base overlying said finger grip cavity for supporting said hand set in resting position, and hookswitch plungers in said cradle normally operated by said hand set when lifted from or placed in said cradle to render said telephone instrument operative to place and to receive telephone calls, said telephone lock comprising: a base lockingly engageable in said finger grip cavity and an arm pivotally secured to said base, said base being substantially U-shaped with two legs and having a lug with a cam slot formed therein affixed to a first one of said legs and a pair of upstanding guard arms affixed to the opposite sides of said first leg in alignment with said lug to conceal said lug, a second one of said legs being folded to be in a plane substantially parallel with said first leg and having its end bent to form a rise for engaging said finger grip cavity to secure said base therein said arm being pivotal to a first position to permit said telephone instrument to be used to place and receive telephone calls and being pivotal to a second position to render said hookswitch plungers inoperative, thereby preventing said telephone instrument from being used to place or receive telephone calls, a lock means for locking said arm in said second position.

2. A telephone lock, as claimed in claim 1, wherein said arm is L-shaped and a lock having a cam is affixed to a first one of its legs and positioned so that said cam is engageable in said cam slot to lock said arm in said second position when said lock is operated, the second one of its legs being bent to render said hookswitch plungers inoperative when said arm is in said second position.

3. A telephone lock, as claimed in claim 2, wherein said second leg of said arm overlies said hand set to prevent it from being removed from said cradle.

4. A telephone lock, as claimed in claim 3, wherein said second leg has means affixed to its underside to prevent said second leg from marring said hand set.

5. A telephone lock, as claimed in claim 2, wherein said second leg of said arm is substatnially T-shaped and engages said hookswitch plungers when said arm is in said second position to prevent them from being operated.

References Cited

UNITED STATES PATENTS

| | | | |
|---|---|---|---|
| 1,999,948 | 4/1935 | Stephenson | 179—189 XR |
| 2,647,959 | 8/1953 | Mahoney | 179—189 XR |
| 2,864,906 | 12/1958 | Medenbach | 179—189 |
| 3,301,969 | 1/1967 | Darling | 179—189 |

KATHLEEN H. CLAFFY, Primary Examiner

B. P. SMITH, Assistant Examiner

U.S. Cl. X.R.

70—123, 292—101